US008452723B2

(12) United States Patent
Belyy et al.

(10) Patent No.: US 8,452,723 B2
(45) Date of Patent: May 28, 2013

(54) DATASET PREVIEWS FOR ETL TRANSFORMS

(75) Inventors: Andrey Belyy, Sunnyvale, CA (US); Freda Xu, Cupertino, CA (US); Thomas Herdan, San Jose, CA (US); Min He, San Jose, CA (US); Awez Syed, San Jose, CA (US); Wu Cao, Redwood City, CA (US); Monfor Yee, Palo Alto, CA (US)

(73) Assignee: Business Objects Software Ltd. (IE)

( * ) Notice: Subject to any disclaimer, the term of this patent is extended or adjusted under 35 U.S.C. 154(b) by 75 days.

(21) Appl. No.: 13/101,418

(22) Filed: May 5, 2011

(65) Prior Publication Data

US 2012/0284223 A1    Nov. 8, 2012

(51) Int. Cl.
 *G06F 17/00*    (2006.01)
(52) U.S. Cl.
 USPC ......................................................... 707/602

(58) Field of Classification Search
 USPC .................. 707/601, 602, 634–640, 722–730
 See application file for complete search history.

(56) References Cited

U.S. PATENT DOCUMENTS

| 2009/0089254 A1* | 4/2009 | Von Kaenel et al. | 707/3 |
| 2011/0093435 A1* | 4/2011 | Zha et al. | 707/639 |
| 2011/0264649 A1* | 10/2011 | Hsiao et al. | 707/722 |

* cited by examiner

*Primary Examiner* — Wilson Lee
(74) *Attorney, Agent, or Firm* — Fountainhead Law Group PC (57) ABSTRACT

Disclosed is a user interface on a display for editing data transformations comprising an ETL process. A first display area presents a data representation of a data transformation. A second display area presents a view of input data, and a third display are presents a view of output data. User input to modify the data transformation is received. In response to receiving the user input, the third display area is updated with output data generated by applying the modified data transformation to the input data.

19 Claims, 9 Drawing Sheets

DATASET PREVIEWS FOR ETL TRANSFORMS

BACKGROUND

The present invention relates to data warehousing, and in particular to ETL (Extract, Transform, Load) transformations for loading data in the data warehouse.

Unless otherwise indicated herein, the approaches described in this section are not prior art to the claims in this application and are not admitted to be prior art by inclusion in this section.

The data generated by the different organizations (e.g., marketing, manufacturing, sales, etc.) comprising an enterprise are typically stored in a data repository commonly referred to as a data warehouse. The execution of data handling processes include: exporting the data from the operational data sources in each organization (e.g., marketing analyses, manufacturing inventory databases, sales databases, customer relationship management database, etc.); transforming the exported data into the format of the target tables of the data warehouse; and loading the transformed data into the data warehouse. The category of tools that are responsible for this task is generally referred to as Extraction Transformation Loading (ETL) tools. The functionality of ETL tools can be coarsely grouped into the following tasks: (a) the identification of relevant information at the source side; (b) the extraction of this information; (c) the customization and integration of the information coming from multiple sources into a common format; (d) the cleaning of the resulting data set, on the basis of database and business rules, and (e) the propagation of the data to the data warehouse, a data mart, and/or the like.

Defining the proper data transformations is an important aspect of populating the data warehouse. An enterprise may require numerous ETL processes to input and process data from myriad data sources and to load the resulting output data. The typical workflow for developing an ETL process includes defining the source data (which may constitute multiple sources of data), specifying one or more data transformations to massage, analyze, or other transform the data, and loading the resulting transformed data into one or more targets (e.g., data warehouse, data mart, and so on). The results of the transformation can then be analyzed. If the results of a particular ETL process are incorrect or otherwise unacceptable, a user may need to modify the extraction process and/or the constituent data transformations, and run the process again. In any significant enterprise, a large volume of data is extracted from the various data sources and transformed, and so an ETL process can take on the order of hours to complete. Accordingly, fine tuning or debugging the ETL process can be a time consuming effort. The problem can be exacerbated in a situation where the ETL process must be completed within a certain window of time.

These and other issues are addressed by embodiments of the present invention, individually and collectively.

SUMMARY

In embodiments, a system and method for a user interface for an ETL process includes presenting on a display device a user interface having a display of one or more constituent data transformations displayed in a first area of the display device, a view on input data displayed in a second area of the display device, and a view of output data displayed in a third area of the display device. The output data represents data generated by performing the data transformation on the input data. A user modifies the data transformation, and in response to the modification the third area is updated with output data generated by performing the modified data transformation on the input data.

In embodiments the output data is generated by applying the data transformation to a subset of the input data. In an embodiment, the subset of input data can be based on a predetermined criterion, can be randomly selected, or can be selected by a user. The size of the subset of input data can be predetermined size or selected by the user.

In embodiments, the user can specify a source of the input data. The user can enter their own input data. The user can make modifications to the input data, wherein the third area can display output data generated by performing the data transformation on the changed input data.

In embodiments, the input data can be traced to the output data. Conversely, the output data can be traced back to the input data.

The following detailed description and accompanying drawings provide a better understanding of the nature and advantages of the present invention.

BRIEF DESCRIPTION OF THE DRAWINGS

FIGS. 2A-2C are enlarged views of portions of the user interface illustrated in FIG. 2.

DETAILED DESCRIPTION

Described herein is method to facilitate the workflow for developing ETL processes.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In embodiments, the term "data flow" is used to refer to an ETL process. Accordingly, as used herein the term "data flow" will refer to an ETL process wherein one or more data sources provide input data, the input data is transformed by one or more data transformations, and the output of performing (or applying) the data transformations on the input data are stored into one or more data targets. In a given enterprise, ETL processing may involve the execution or processing of many such data flows to extract data from its various organizations, transform that data, and load it into a suitable repository such as a data warehouse.

The input data that feeds into the data transformations of a data flow and can be in any form; for example, flat files, text analyses sources, DTDs (document type definition files), XML schemas, COBOL copybooks, Excel workbooks, data services adapters, relational data sources, database (DB) tables, and so on. Data sources may also include data generated by software applications. The constituent data transformations of the data flow can include any conventionally known data transformations; they transform the input data. Data targets receive the data that is generated when the data transformations are performed on (or applied to) the input data. Data targets are typically data tables and other suitable file structures that are stored on a mass storage system.

Merely as an example, a data flow may comprise a single data source (e.g., a Customer data table having a name column and purchase amount column). The data flow may include a single data transformation (e.g., select from the Customer data table those customers whose purchase amounts are greater than $100). When a SELECT data transformation operation is performed on the Customer data table, the output data that is generated will consist of those rows from the Customer data table where the purchase amount column is >$100. Finally, the data flow may include a single data target to store the rows selected from the Customer data table.

Figure 1:
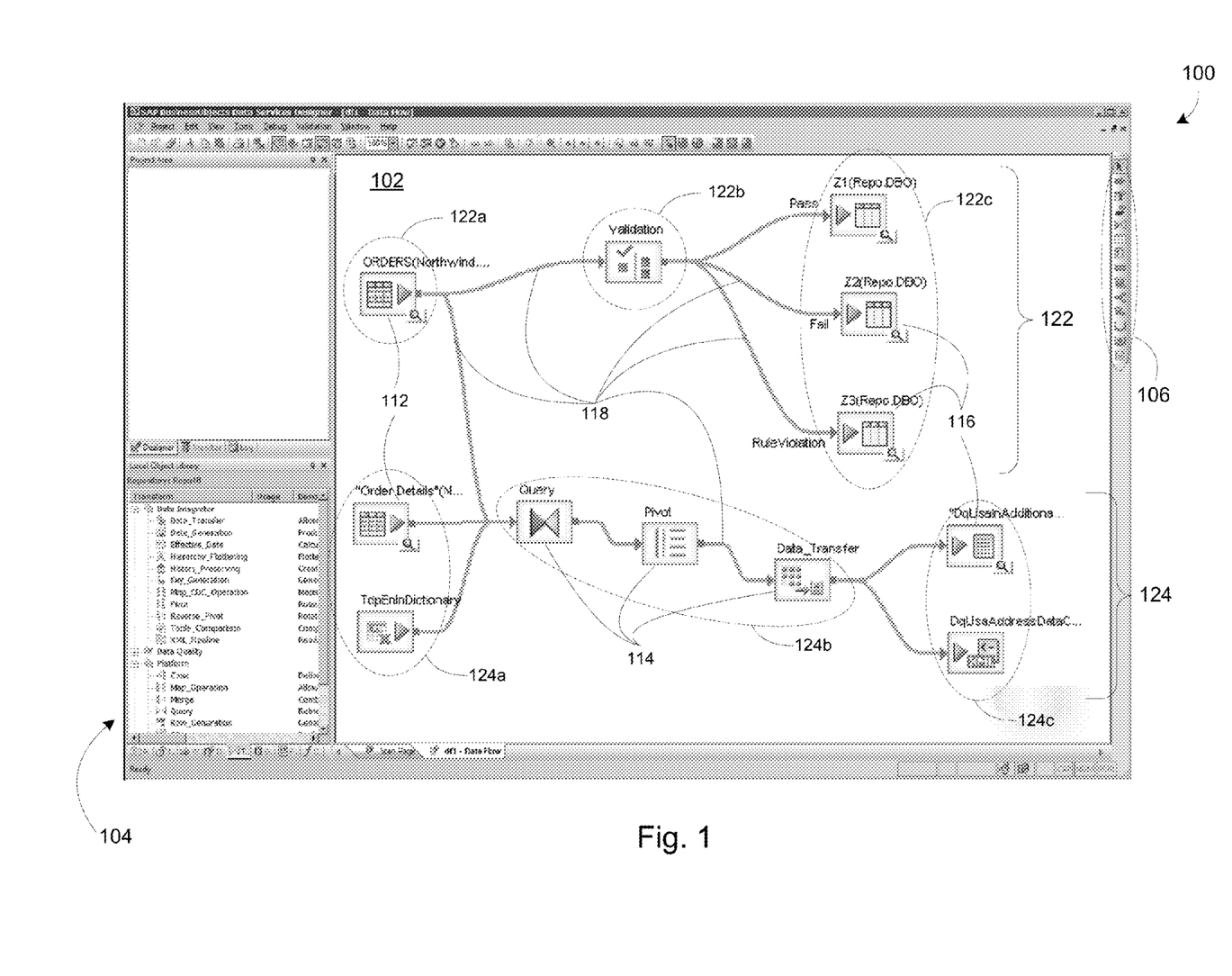
FIG. 1 is an illustration of a user interface for defining data flows.

A user interface can be provided to allow a user to define, display, and modify objects to create a data flow. FIG. 1 shows a screenshot of a user interface 100 that can be displayed on a suitable display device. The user interface 100 includes a workspace 102 within which various objects can be placed and connected to define a data flow. An object library 104 provides access to a repository of objects for defining data flows. FIG. 1 shows examples of two data flows, 122 and 124.

Objects include input objects 112 which specify data sources such as files, DB tables and so on. The figure, for example, shows the data flow 122 specifies one input object as its data source 122a. Similarly, the data sources 124a for data flow 124 are indicated in the workspace 102 by two input objects. Objects include data transformations 114 which specify the data transformations of a data flow. For example, data flow 122 includes a single data transformation 122b called "validation". Data flow 124 includes three data transformations 124b. Objects include output objects 116 which specify data targets where data generated by the data transformations are placed; e.g., a data table or an output file, and so on. For example, data flow 122 comprises three data targets 122c which are specified by three corresponding output objects. Likewise, two data targets 122c in data flow 122 are specified by two output objects. Objects also include connectors 118 to specify the flow of data among the objects 112, 114, 116.

In accordance with the present invention, the user can edit portions of the data flow, in real time. In other words, as changes are being made to the data flow definition, the user can see corresponding changes that might manifest in the output data. For example, suppose the user modifies one of the data transformations of the data flow, data feeding in from the data sources can be immediately re-evaluated and updated output data can be presented to the user. Such real-time turnaround processing facilitates defining and "debugging" a data flow, allowing the user to make changes and quickly review the effects of those changes.

Figure 1A:
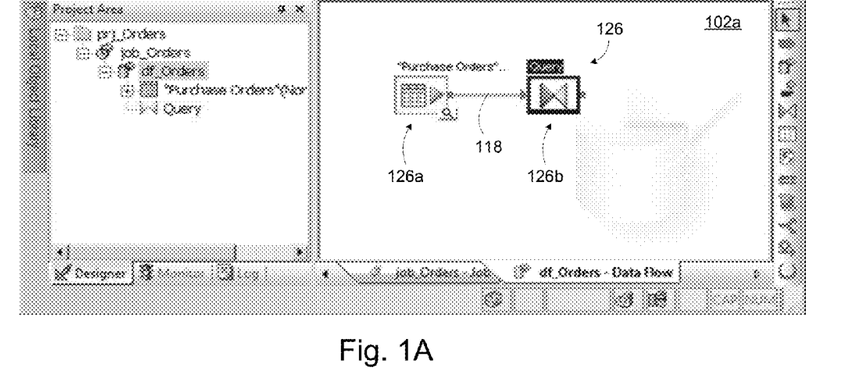
FIG. 1A illustrates an example of an incomplete data flow.

The data flows 122, 124 in FIG. 1 are referred to as complete data flows, namely the data source, the data transformations, and a target are defined or otherwise specified for each data flow. The workspace 102a in FIG. 1A shows an example of an incomplete data flow 126. The data flow 126 includes a data source 126a and a single data transformation 126b. However, a data target has not been provided. In embodiments of the present invention, the user can also edit an incomplete data flow, in real time, despite the fact that the data flow is incomplete. In other words, as changes are made to the incomplete data flow, such data flow can still be evaluated.

In embodiments, a transform editor (manifested in a user interface) can allow the user to edit portions of a data flow and view the effects of their edits in real time. In an embodiment, for example, the user can select elements of a data flow (e.g., one of the data transformations of the data flow) and invoke the transform editor to begin an editing session. In embodiments, the transform editor can be invoked by clicking on a control button, or by navigating through a series of drop down menus. For example, in FIG. 1, a control can be provided in a tool palette 106 for invoking the transform editor. Data views of the selected portions of the data flow can be displayed in a user interface of the transform editor.

The discussions which follow will consider as a running example the incomplete data flow 126 shown in FIG. 1A, and will suppose that the user has selected the data transformation 126b and has invoked the transform editor.

Figure 2:
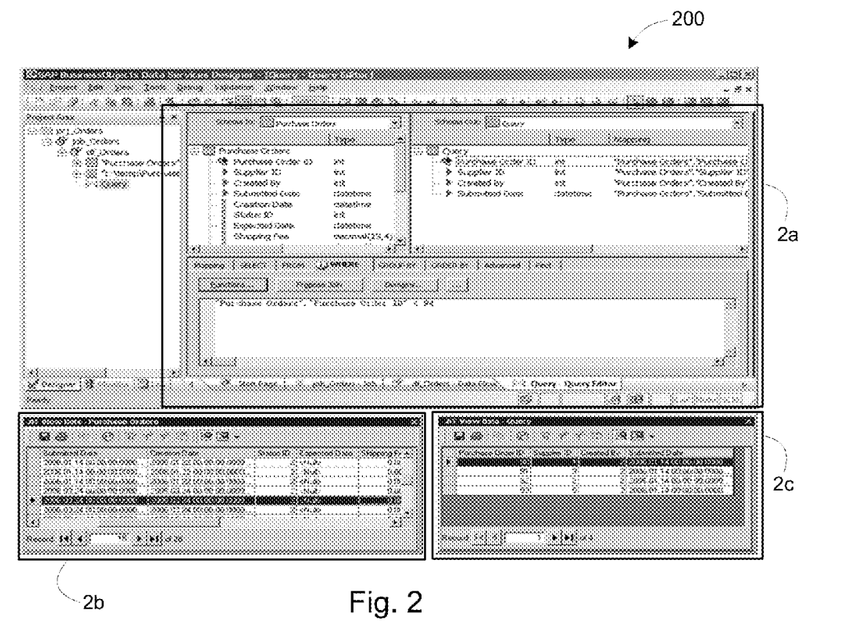
FIG. 2 illustrates a user interface in accordance with embodiments of the present invention.

Referring to FIGS. 2 and 2A-2C, portions of a user interface 200 for the transform editor in accordance with embodiments of the present invention are shown. FIG. 2 is a screenshot of the user interface 200 displayed on a suitable display device (e.g., see FIG. 7) in accordance with an embodiment. The user interface 200 may include a data view 2a displayed in a first area of the display device. The data view 2a can display a data representation of the selected data transformation selected by the user. In our running example, the selected data transformation is the "Query" data transformation 126b.

Figure 2A:
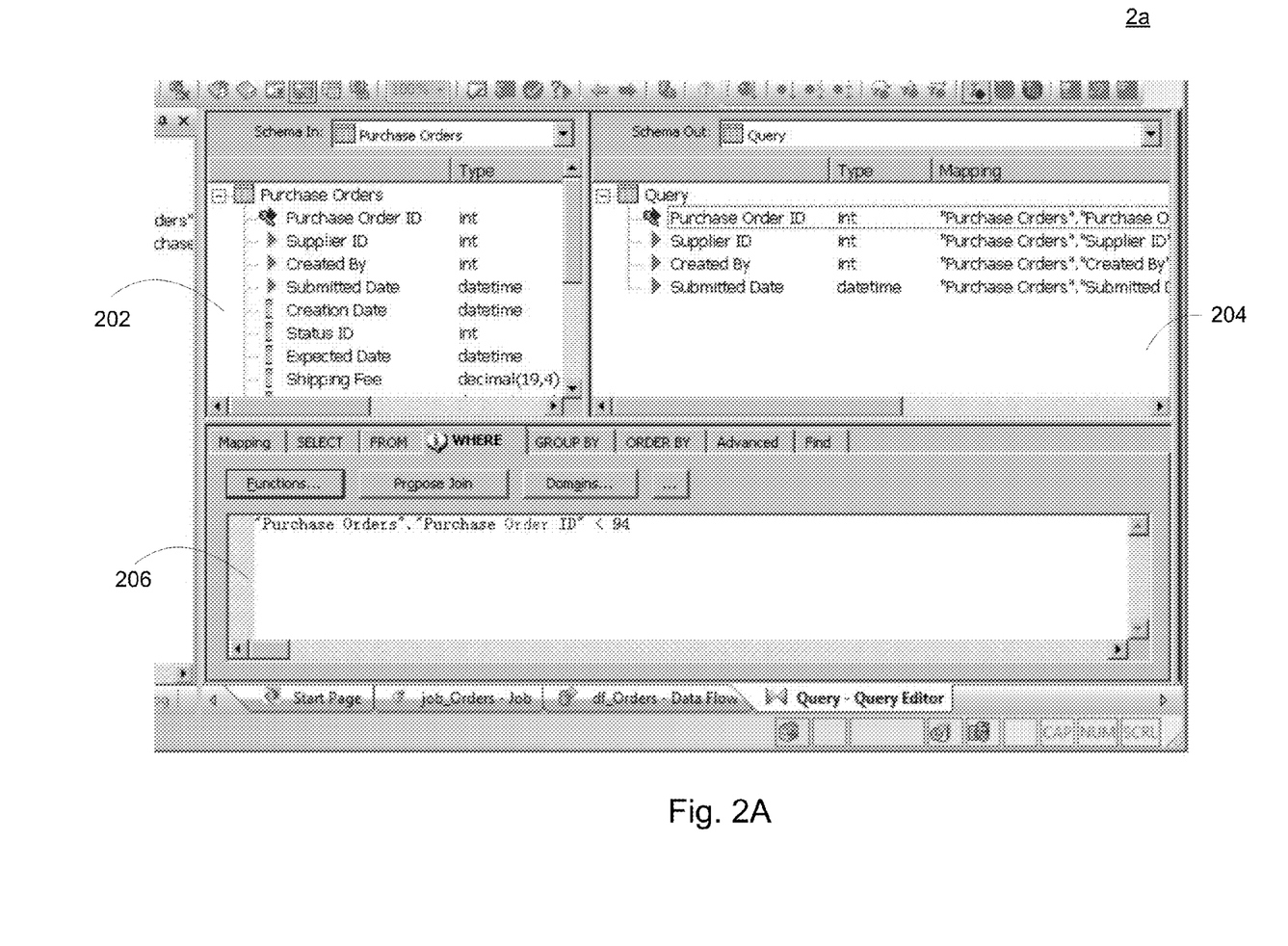

Referring to the enlarged view shown in FIG. 2A, the data view 2a may include an input schema window 202 which shows the structure of the input data (input dataset) that feeds into the selected data transformation. In embodiments, the source of the input data may be determined based on the selected data transformation. For example, suppose the selected data transformation is the "Validation" data transformation of the data flow 122 shown in FIG. 1. The source of input data can be the data source 122a, and the input schema window 202 would show the data structure of that data source. As another example, suppose the selected data transformation is the "Data_Transfer" data transformation of the data flow 124, then the source of input data could be the output data generated by the "Pivot" data transformation, and the input schema window 202 would show the data structure of the "Pivot" output data.

In our running example, the user has selected the "Query" data transformation 126b. Accordingly, the input schema window 202 can specify the fields that constitute the Purchase Orders data table 126a as the source of input data. An output schema window 204 can display the format of the output data (output dataset) that is produced by the "Query" data transformation 126b.

In embodiments, the data view 2a includes a transform edit window 206 which allows the user to view and modify the selected data transformation that is being developed or debugged. Data transformations may comprise one or more transformation instructions; e.g., a SELECT statement, a JOIN statement, and so on. Accordingly, the transform edit window 206 can display the transformation instructions that comprise the selected data transformation in question. The user can modify the selected data transformation by editing one or more of its constituent transformation instructions.

In our running example, the selected data transformation is the "Query" data transformation 126b, and in FIG. 2A the transform edit window 206 displays the WHERE clause of the transformation instruction comprising "Query" data transformation. The user may make any suitable modification to the transformation instruction(s) of the "Query" data transformation 126*b*. For example, the user may edit the "<94" selection criterion to use a different value, the user may change the selection criterion to be based on a different column in the Purchase Orders data table 126*a*, the user may add another selection criterion, and so on. The user may delete the transformation instruction(s) comprising the "Query" data transformation 126*b* and replace it with a new one. The user may specify additional transformation instructions to add more functionality to the "Query" data transformation 126*b*, and so on.

Refer now to FIGS. 1A, 2, and 2B. In embodiments, the user interface 200 may further include a data view 2*b* in a second area of the display device for displaying a view of the data comprising the source of input data. In an embodiment, the source of input data can be actual data generated from the different organizations in the enterprise. For example, in our running example, the source of input data is the Purchase Orders data table 126*a*. Referring to the enlarged view shown in FIG. 2B, the data view 2*b* can display the data comprising the Purchase Orders data table 126*a* as rows of data 212. A record locator 214 can be provided to allow the user to select an identified row of data. Scroll controls 216 can allow the user to view the rows and fields of the data table. Suitable highlighting can be used to graphically or otherwise visually identify a selected row of data; e.g., white text on black background, flashing text, different colored text, etc.

Refer now to FIGS. 1A, 2, and 2C. In embodiments, the user interface 200 may further include a data view 2*c* in a third area of the display device for displaying a view of output data generated when the selected data transformation is performed on the input data. For example, the output data may be displayed as rows of data 222. A record locator 224 can be provided to allow the user to select an identified row of output data. Scroll controls can allow the user to view the rows and fields of the data table, although such controls are not illustrated in the particular example shown in FIG. 2C. Suitable highlighting can be used to graphically or otherwise visually identify a selected row of data; e.g., white text on black background, flashing text, different colored text, etc.

In accordance with the present invention, the output data presented in data view 2*c* can be updated in real time as changes are made in the transform edit window 206 to the transformation instruction(s) that constitute the selected data transformation. For example, the transform edit window 206 shows "<94" as the selection criterion for the WHERE clause. The data view 2*c* shows the output data produced by applying the selected data transformation to the input data, namely rows in which their Purchase Order ID fields are less than 94. Suppose the user edits the value to show "<95". In accordance with the present invention, the data view 2*c* may be updated to show all data rows where the Purchase Order ID is less than 95. In embodiments, the data view 2*c* refreshes in this way each time the user makes changes to or otherwise edits the transformation instruction(s) that constitute the selected data transformation. Embodiments in accordance with the present invention therefore give the user a view of how the data transformation works without having to execute the whole data flow.

In embodiments, the output can be stored locally rather than in an actual output data table. Since the output is locally stored, the user can test their data transformations without danger of corrupting or otherwise affecting actual "live" data tables used by the enterprise.

The source of the input data that is transformed by the selected data transformation can be specified in various ways. With respect to our running example, the input data can be all of the data contained in the Purchase Orders data table 126*a*. In embodiments, the input data may be only a subset (i.e., a sample) of the data contained in the source of input data. For example, suppose the Purchase Orders data table 126*a* consists of 1000 rows of data. Accordingly, the input data may be determined by taking the first N rows of the data table, or by taking every Nth row of the data table, or by taking N rows based on other such criteria. The input data may be determined by taking N random rows. The value of N can be a predefined value (e.g., hardcoded at 50), or N can be user specified. The input data may be determined by taking rows from the data table as specified by a filter supplied by the user. The user can identify specific rows from the data table as the input data.

In embodiments, the source of the input data can be a local copy of the actual input data generated from the different organizations in the enterprise. For example, in our running example the Purchase Orders data table 126*a* may be a local copy of the actual Purchase Orders data table. Using a local copy of the actual data rather than the actual data itself allows the user to customize the input data to test specific cases (e.g., modify, delete, or add data) without fear of corrupting or otherwise affecting the actual data.

As explained above, the source of input data can be based on the selected data transformation. For example, consider FIG. 1. Suppose the selected data transformation is the "Data_Transfer" data transformation of the data flow 124. In an embodiment, the source of input data could be the output data generated by the "Pivot" data transformation. In an embodiment, the user can specify another source of input data instead of the "Pivot" output data. This can be useful if the user desires to their own test data.

Figure 3:
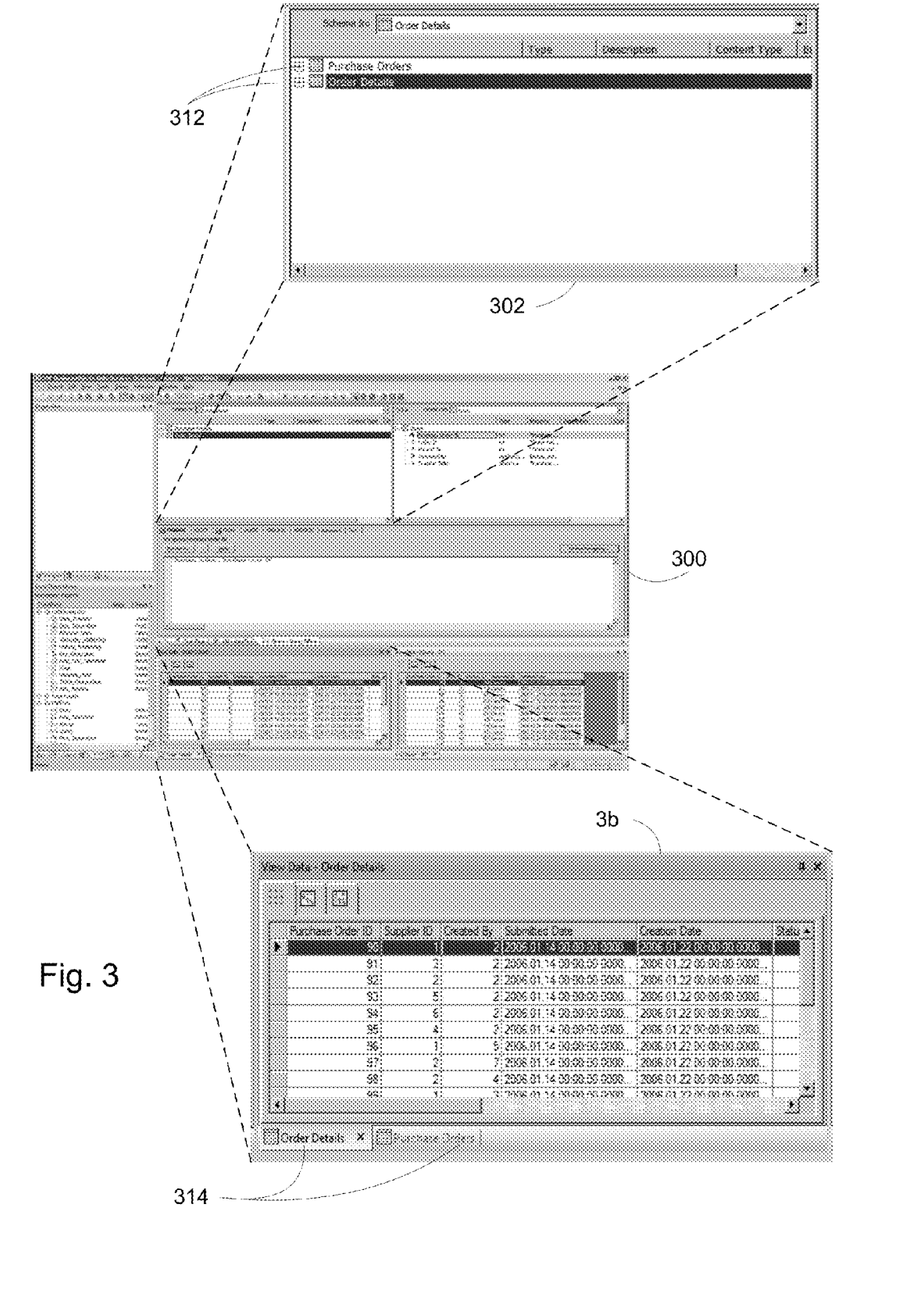
FIG. 3 shows an embodiment having multiple sources of input data.

A selected data transformation may have more than one source of input data. For example, the "Query" data transformation shown in FIG. 1 receives data from three different sources. In embodiments, when multiple sources of input data occur, the user interface for the transform editor can present suitable controls for navigating among the multiple sources of input data. Referring to FIG. 3, a user interface 300 is shown for an invocation of the transform editor for which two sources of input data have been specified, a Purchase Orders data table and an Order Details data table. Two portions of the user interface 300 are expanded to show how the user interface can accommodate multiple sources of input data: input schema window 302 and data view 3*b*. The input schema window 302 shows two controls 312, one for each source of input data. Clicking on one of the controls 312 will display a schema for the corresponding source of input data. Likewise, the data view 3*b* displays the data of the selected source of input data. In an embodiment, tab controls 314 can be provided to select from among multiple sources of input data, causing the data view 3*b* to display the data corresponding to a selected source of input data.

Figure 4:
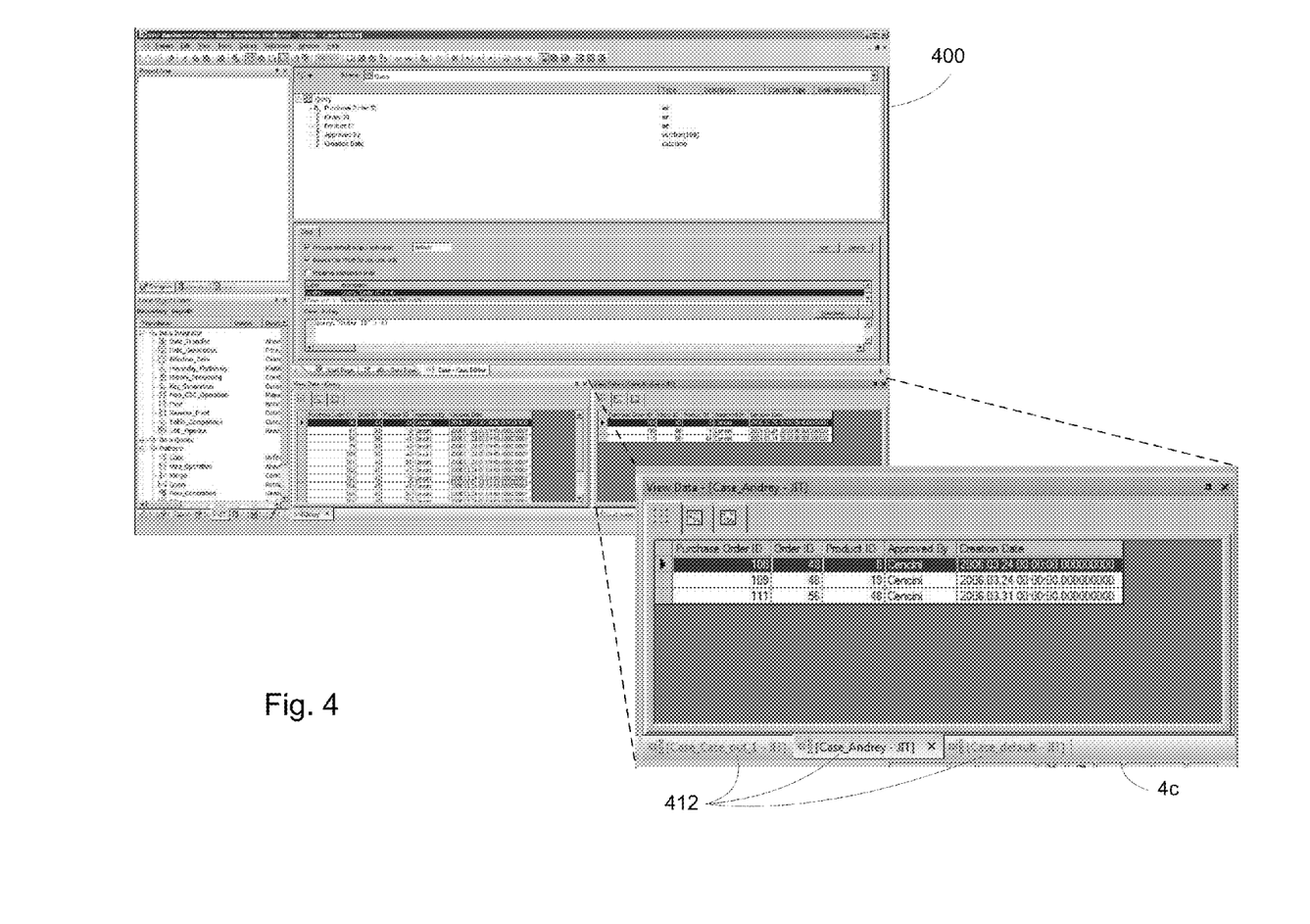
FIG. 4 shows an embodiment having multiple outputs of data.

A selected data transformation may be defined to produce more than one stream of output data. In embodiments, when a selected data transformation defines multiple outputs of data, the transform editor user interface can present suitable controls for navigating among the multiple outputs of data. Referring to FIG. 4, a user interface 400 is shown for an invocation of the transform editor for which three outputs of data are defined for a selected data transformation. A data view 4*c* portion of the user interface 400 is shown expanded. The data view 4*c* displays the data of the selected output data.

Tab controls 412 can be provided to select from among multiple outputs of data, causing the data view 4c to display the corresponding data.

Another aspect of the present invention is "tracing" between input data and output data. The input data can be traced forward to identify what output data is produce. Conversely, the output data can be traced back to identify which input data was transformed to produce the output data.

In embodiments, selected input data can be "traced forward" to identify any output data that was generated or otherwise derived when the selected data transformation is performed on the selected input data. In other words, for selected input data, a subset of the output data may be identified that can trace its origins to the selected input data. The subset may be empty if the selected input data did not result in generating any output data.

Figure 5:
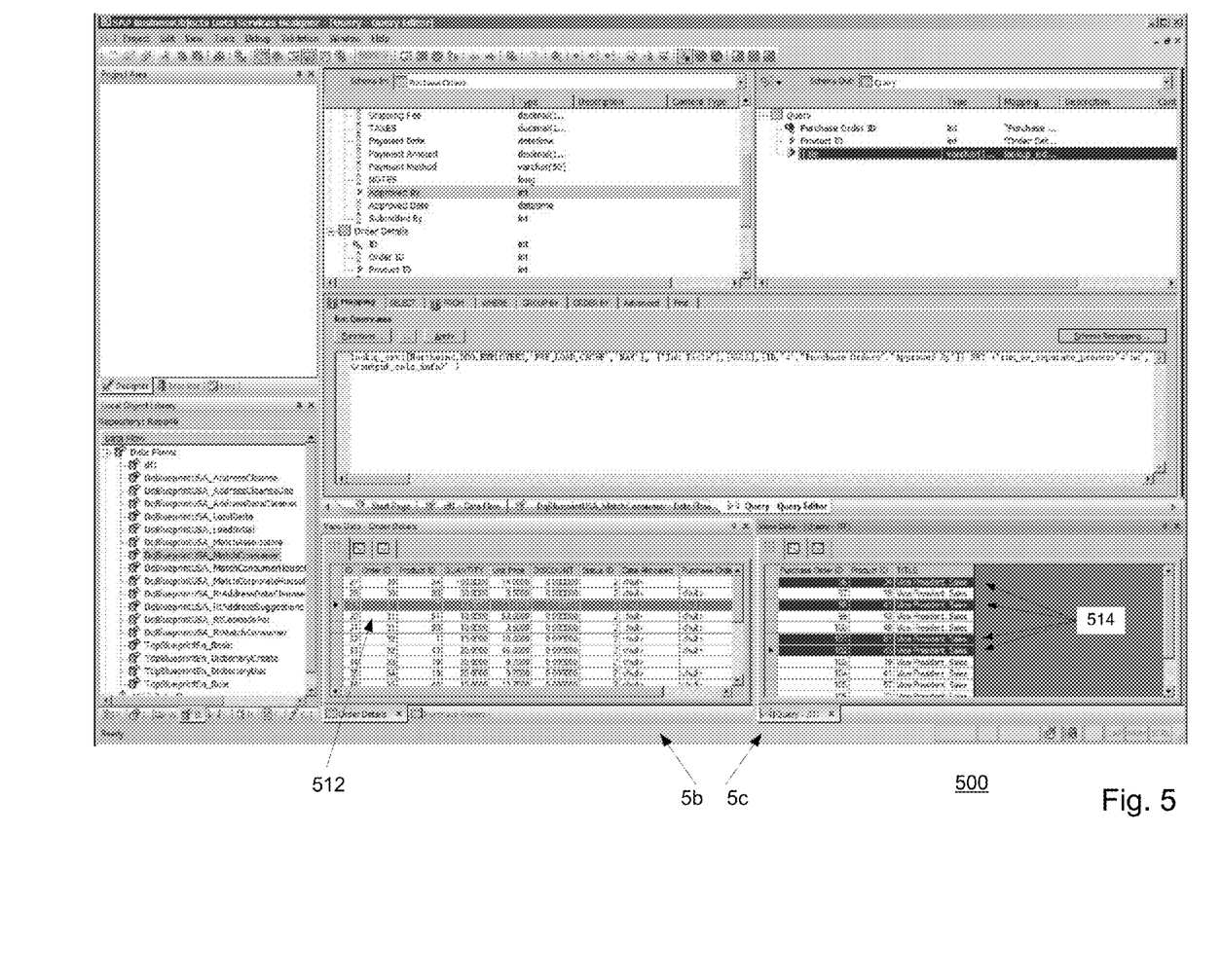
FIG. 5 illustrates an embodiment of tracing forward in accordance with the present invention.

Referring to FIG. 5, for example, a user interface 500 includes a data view 5b for displaying a view of the source(s) of input data and a data view 5c for displaying a view of the output data. The user may select a subset of the input data; e.g., the data view 5b identifies one or more rows 512 of the input data. In response to the selection, the selected input data can be traced forward to identify any output data that is produced by performing the selected data transformation on the selected input data. The data view 5c may refresh to identify any such output data that can trace its origin to any of the selected input data. For example, the figure shows rows 514 in the data view 5c having been identified (e.g., indicated by highlighting). In embodiments, output data that contains any data values among the selected input data may be deemed as having its origin among the selected input data. Output data that was generated based on logical or arithmetic operations performed on any of the selected input data may be deemed to have its origin in the selected input data.

Figure 6:
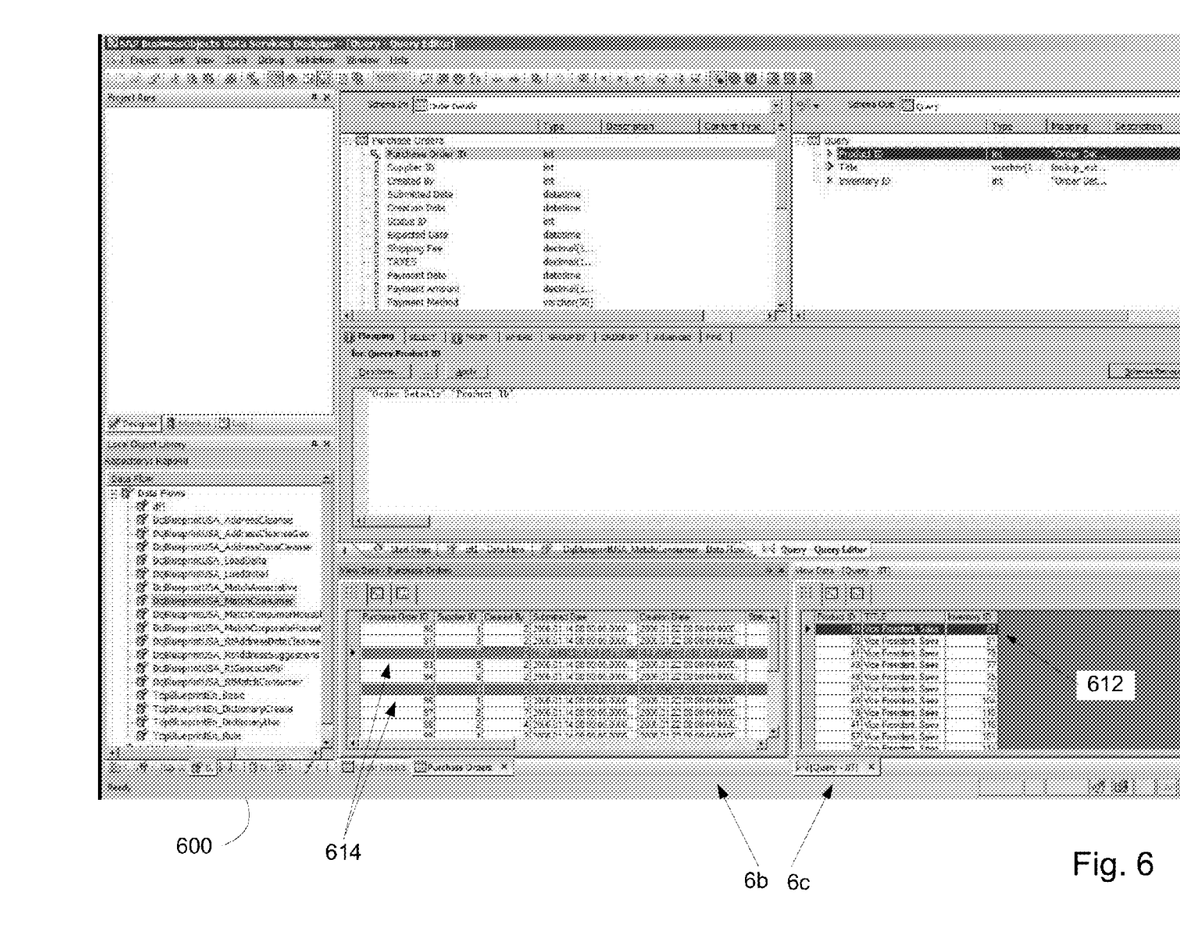
FIG. 6 illustrates an embodiment of tracing back in accordance with the present invention.

In embodiments, selected output data can be "traced back" to identify the input data that was transformed by the selected data transformation to generate or otherwise derive the selected output data. In other words, for the selected output data, a subset of the input data that was used to generate the selected output data can be identified. Referring to FIG. 6, for example, a user interface 600 includes a data view 6b for displaying a view of the source(s) of input data and a data view 6c for displaying a view of the output data. The user may select a subset of the output data; e.g., the data view 6c identifies one or more rows 612 of the output data. In response to the selection, the selected output data can be traced back to identify which of the input data was transformed by the selected data transformation in order to produce the selected output data. The data view 6b may refresh to identify the input data. For example, the figures shows rows 614 in the data view 6b having been identified (e.g., indicated by highlighting). In embodiments, selected output data can be deemed to trace back to any input data whose data values appear in any of the selected output data. Similarly, selected output data can be deemed to trace back to any input data that was logically or arithmetically operated on to produce the selected output data.

In a particular implementation, tracing can be provided by adding a new column to the schema for each source of input data. The new column holds a unique row identifier. When the selected data transformation is performed on the input data, the output data can include the row identifiers of the input data used to create the output data. The row identifiers or rows of input data that are filtered out when the selected data transformation is applied will not appear in any of the output data. The row identifiers therefore provide a link between the input data and the output data.

Figure 7:
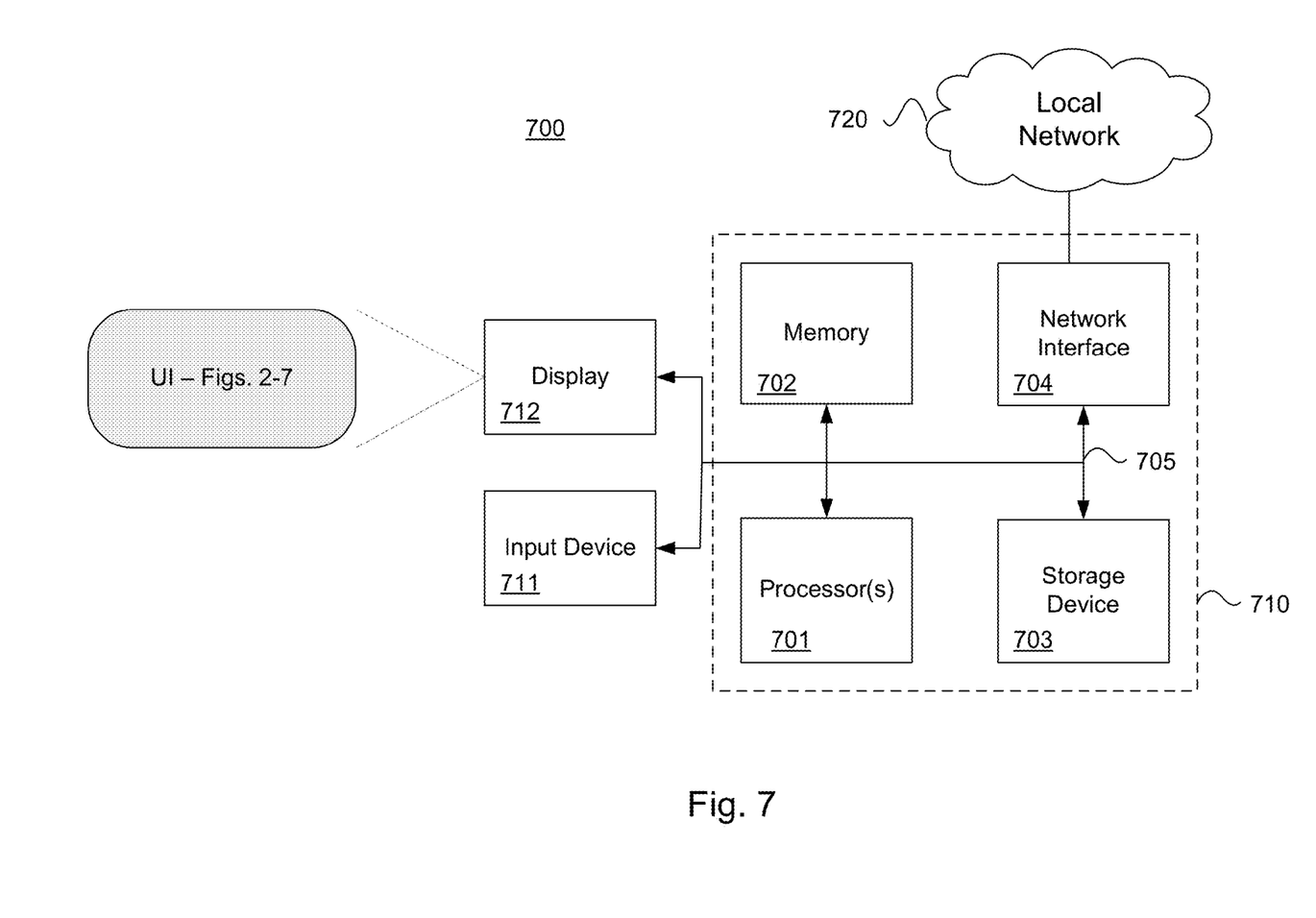
FIG. 7 illustrates a computer system in accordance with embodiments of the present invention.

Referring to FIG. 7, in embodiments, a computer system 700 can be configured to operate in accordance with aspects of the present invention. For example, computer system 700 may be configured display a user interface in accordance with the disclosed embodiments. A data processor subsystem 701 may comprise one or more data processing units. A memory subsystem 702 may comprise random access memory (usually volatile memory such as DRAM) and non-volatile memory such as FLASH memory, ROM, and so on. A storage subsystem 703 may comprise one or more mass storage devices such as hard disk drives and the like. The storage subsystem 703 may include remote storage systems; e.g., for data mirroring, remote backup and such. A network interface subsystem 704 can provide users with access to the computer system 700, for example over a telecommunication network. A system of buses 705 can interconnect the foregoing subsystems, providing control lines, data lines, and/or voltage supply lines to/from the various subsystems. The computer system 700 may include a suitable display(s) 712 and input devices 711 such as a keyboard and a mouse input device.

The memory subsystem 702 may have stored in the non-volatile memory computer executable programs, which when executed can cause the data processing subsystem 701 to display and operate user interfaces in accordance with aspects of the present invention. For example, the memory subsystem 702 may include computer executable programs to display the disclosed user interfaces, to receive input from the user, and to respond with updated displays as disclosed above. The storage subsystem 703 may provide storage for the input data and output data discussed above.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for a workflow for an ETL (extraction, transformation, loading) process comprising operating a computer to perform steps of:

displaying in a first area of a display system a view of a first data transformation from among a plurality of data transformations, the ETL process comprising the plurality of data transformations;

displaying in a second area of the display system a view of input data received from a data source;

displaying in a third area of the display system a view of output data generated by performing the first data transformation on the input data;

receiving information from a user indicative of a change to the first data transformation to define a modified data transformation;

in response to receiving the information from the user, displaying in the third area a view of output data generated by performing the modified data transformation on the input data; and conducting ETL data flow processing comprising:
  receiving input data from the data source;
  transforming the received input data in accordance with the modified data transformation to produce transformed data; and
  loading the transformed data in a data target.

2. The method of claim 1 wherein the step of performing the first data transformation on the input data comprises performing the first data transformation on a subset of the input data, wherein step of performing the modified data transformation on the input data comprises performing the modified data transformation on the subset of the input data.

3. The method of claim 2 wherein the subset of the input data is selected based on a predetermined criterion, is randomly selected, or is selected by a user.

4. The method of claim 2 wherein a number of data items comprising the subset of the input data is a predetermined number a number selected by a user.

5. The method of claim 1 further comprising operating the computer to perform a step of receiving user input indicative of a source of the input data.

6. The method of claim 1 further comprising operating the computer to perform a step of receiving at least some data items of the input data from a user.

7. The method of claim 1 further comprising operating the computer to perform steps of receiving user input indicative of a change to the input data displayed in the second area, and in response thereto, displaying in the third area a view of output data generated by performing the modified data transformation on changed input data.

8. The method of claim 1 further comprising operating the computer to perform steps of receiving user input indicative of a subset of the input data and in response to receiving the user input, visually identifying a subset of the output data, wherein the subset of the output data is derived from the subset of the input data.

9. The method of claim 1 further comprising operating the computer to perform steps of receiving user input indicative of a subset of the output data and in response to receiving the user input, visually identifying a subset of the input data, wherein the subset of the input data is used to derive the subset of the output data.

10. A computer system for a workflow for an ETL (extraction, transformation, loading) process comprising:
a data processing subsystem;
a display subsystem;
a storage subsystem comprising main memory and a disk storage subsystem; and
executable program code stored in the storage subsystem, the executable program code configured to cause the data processing subsystem to:
display in a first area of a display system a view of a first data transformation from among a plurality of data transformations, the ETL process comprising the plurality of data transformations;
display in a second area of the display system a view of input data;
display in a third area of the display system a view of output data generated by performing the first data transformation on the input data;
receive information indicative of a change to the first data transformation to define a modified data transformation; and
in response to receiving the user input, display in the third area a view of output data generated by performing the modified data transformation on the input data,
wherein processing an ETL data flow comprises:
receiving input data from a data source;
transforming the received input data in accordance with the modified data transformation to produce transformed data; and
loading the transformed data in a data target.

11. The system of claim 10 wherein the performing the first data transformation on the input data comprises performing the first data transformation on a subset of the input data, wherein performing the modified data transformation on the input data comprises performing the modified data transformation on the subset of the input data.

12. The system of claim 10 wherein the executable program code is further configured to cause the data processing subsystem to:
receive user input indicative of a change to the input data displayed in the second area; and
in response thereto display in the third area a view of output data generated by performing the modified data transformation on changed input data.

13. The system of claim 10 wherein the executable program code is further configured to cause the data processing subsystem to:
receive user input indicative of a subset of the input data; and
in response thereto, visually identifying a subset of the output data, wherein the subset of the output data is derived from the subset of the input data.

14. The system of claim 10 wherein the executable program code is further configured to cause the data processing subsystem to:
receive user input indicative of a subset of the output data; and
in response thereto, visually identifying a subset of the input data, wherein the subset of the input data is used to derive the subset of the output data.

15. A non-transitory computer readable storage medium for an ETL process having stored thereon executable program code configured to cause a data processing system to perform steps of:
displaying in a first area of a display system a view of a first data transformation from among a plurality of data transformations, the ETL process comprising the plurality of data transformations;
displaying in a second area of the display system a view of input data;
displaying in a third area of the display system a view of output data generated by performing the first data transformation on the input data;
receiving information indicative of a change to the first data transformation to define a modified data transformation; and
in response to receiving the user input, displaying in the third area a view of output data generated by performing the modified data transformation on the input data,
wherein processing an ETL data flow comprises:
receiving input data from a data source;
transforming the received input data in accordance with the modified data transformation to produce transformed data; and
loading the transformed data in a data target.

16. The computer readable storage medium of claim 15 wherein the step of performing the first data transformation on the input data comprises performing the first data transformation on a subset of the input data, wherein step of performing the modified data transformation on the input data comprises performing the modified data transformation on the subset of the input data.

17. The computer readable storage medium of claim 15 wherein the executable program code is further configured to cause the data processing system to perform steps of receiving user input indicative of a change to the input data displayed in the second area, and in response thereto displaying in the third area a view of output data generated by performing the modified data transformation on changed input data.

18. The computer readable storage medium of claim 15 wherein the executable program code is further configured to cause the data processing system to perform steps of receiving user input indicative of a subset of the input data and in response to receiving the user input, visually identifying a subset of the output data, wherein the subset of the output data is derived from the subset of the input data.

19. The computer readable storage medium of claim 15 wherein the executable program code is further configured to cause the data processing system to perform steps of receiving user input indicative of a subset of the output data and in response to receiving the user input, visually identifying a subset of the input data, wherein the subset of the input data is used to derive the subset of the output data.

* * * * *